US006225394B1

(12) United States Patent
Lan et al.

(10) Patent No.: US 6,225,394 B1
(45) Date of Patent: *May 1, 2001

(54) INTERCALATES FORMED BY CO-INTERCALATION OF ONIUM ION SPACING/COUPLING AGENTS AND MONOMER, OLIGOMER OR POLYMER ETHYLENE VINYL ALCOHOL (EVOH) INTERCALANTS AND NANOCOMPOSITES PREPARED WITH THE INTERCALATES

(75) Inventors: Tie Lan, Lake Zurich; Anthony S. Tomlin, Island Lake; Vasiliki Psihogios, Wheeling, all of IL (US)

(73) Assignee: AMCOL International Corporation, Arlington Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/323,629

(22) Filed: Jun. 1, 1999

(51) Int. Cl.[7] .................................................. C08K 3/00
(52) U.S. Cl. ........................ 524/445; 524/446; 524/447
(58) Field of Search .................................. 524/445, 446, 524/447

(56) References Cited

U.S. PATENT DOCUMENTS

| 2,035,546 | 3/1936 | Hamilton .............................. 167/24 |
| 3,419,460 | 12/1968 | Ure ........................................ 161/162 |
| 3,419,517 | 12/1968 | Hedrick et al. ....................... 260/37 |
| 3,515,626 | 6/1970 | Duffield ............................... 161/162 |
| 3,773,708 | 11/1973 | Takahashi et al. ................... 260/41 R |
| 3,795,650 | 3/1974 | Burns et al. ......................... 260/33.4 R |
| 3,912,532 | 10/1975 | Simone ............................... 106/308 N |
| 3,929,678 | 12/1975 | Laughlin et al. .................... 252/526 |
| 3,929,849 | 12/1975 | Oswald ............................... 260/448 |
| 4,053,493 | 10/1977 | Oswald ............................... 260/448 |
| 4,125,411 | 11/1978 | Lyons .................................. 106/291 |
| 4,136,103 | 1/1979 | Oswald ............................... 260/448 |
| 4,210,572 | 7/1980 | Herman et al. ..................... 260/40.4 |
| 4,251,576 | 2/1981 | Osborn et al. ....................... 428/331 |
| 4,400,485 | 8/1983 | Mukamal et al. ................... 524/444 |
| 4,431,755 | 2/1984 | Weber et al. ........................ 523/203 |
| 4,434,075 | 2/1984 | Mardis et al. ....................... 252/315.2 |
| 4,472,538 | 9/1984 | Kamigaito et al. .................. 523/202 |
| 4,500,670 | 2/1985 | McKinley et al. .................. 524/445 |
| 4,546,145 | 10/1985 | Kishida et al. ...................... 524/780 |
| 4,600,744 | 7/1986 | Libor et al. .......................... 524/446 |
| 4,613,542 | 9/1986 | Alexander ........................... 428/290 |
| 4,624,982 | 11/1986 | Alexander ........................... 524/446 |
| 4,739,007 | 4/1988 | Okada et al. ........................ 524/789 |
| 4,789,403 | 12/1988 | Rice .................................... 106/417 |
| 4,798,766 | 1/1989 | Rice .................................... 428/404 |
| 4,810,734 | 3/1989 | Kawasumi et al. ................. 523/216 |
| 4,842,651 | 6/1989 | Ravet et al. ......................... 106/487 |
| 4,849,006 | 7/1989 | Knudson, Jr. ....................... 71/64.11 |
| 4,851,021 | 7/1989 | Bohrn et al. ........................ 65/17 |
| 4,875,762 | 10/1989 | Kato et al. ........................... 350/357 |

(List continued on next page.)

FOREIGN PATENT DOCUMENTS

| 2209671 | 1/1998 | (CA) .............................. C08L/77/06 |
| 1 642 122 | 7/1970 | (DE) . |
| 281 585 A5 | 8/1990 | (DE) . |
| 0 205 281 A3 | 12/1986 | (EP) . |
| 0 335 653 A1 | 10/1989 | (EP) . |
| 0 358 415 A1 | 3/1990 | (EP) . |
| 0 479 031 A1 | 4/1992 | (EP) . |
| 0 548 940 A1 | 6/1993 | (EP) . |
| 0 619 182 A1 | 10/1994 | (EP) . |
| 0 645 181 A2 | 3/1995 | (EP) . |
| 0 747 451 A2 | 12/1996 | (EP) . |
| 0 761 739 A1 | 3/1997 | (EP) . |
| 0 780 340 A1 | 6/1997 | (EP) . |
| 0 818 508 A2 | 1/1998 | (EP) .............................. C08L/77/00 |
| 1 146 668 | 3/1969 | (GB) . |
| 1 565 362 | 4/1980 | (GB) . |
| 2 088 932 | 6/1982 | (GB) . |
| WO 93/04117 | 3/1993 | (WO) . |
| WO 93/04118 | 3/1993 | (WO) . |
| WO 93/11190 | 6/1993 | (WO) . |
| WO 96/08526 | 3/1996 | (WO) . |
| WO 98/01346 | 1/1998 | (WO) . |

OTHER PUBLICATIONS

R. Levy, et al., "Interlayer Adsorption of Polyvinylpyrrolidone On Montmorillonite", Journal of Colloid and Interface Science, vol. 50, No. 3, March 1975, pp. 442–450.

D.J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

(List continued on next page.)

Primary Examiner—Edward J. Cain
(74) Attorney, Agent, or Firm—Marshall, O'Toole, Gerstein, Murray & Borun

(57) ABSTRACT

Nanocomposite layered materials prepared by co-intercalation of an onium ion, preferably an alkoxylated onium ion and an ethylene vinyl alcohol oligomer or polymer between the planar layers of a swellable layered material, such as a phyllosilicate, preferably a smectite clay. The spacing of adjacent layers of the layered materials is expanded at least about 3 Å, preferably at least about 5 Å, usually preferably to a d-spacing of about 15–20 Å, e.g., 18 Å with the alkoxylated onium ion spacing/coupling agent. The intercalation of the ethylene vinyl alcohol polymer then increases the spacing of adjacent layers an additional at least 2 Å, e.g., to at least about 20 Å, preferably about 25 Å to about 30 Å, generally about 28 Å. Improved $O_2$ barrier properties are observed over a broad range of humidity conditions when intercalation is accomplished by both the solvent route and the direct compounding route. The intercalated and exfoliated layered materials are useful for barrier layers in multi-layer packaging and for coatings.

55 Claims, No Drawings

U.S. PATENT DOCUMENTS

| | | | |
|---|---|---|---|
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 4,956,121 | 9/1990 | Tymon et al. | 252/378 R |
| 5,028,351 | 7/1991 | Kato et al. | 252/315.2 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,552,469 | 9/1996 | Beall et al. | 524/445 |
| 5,554,670 | 9/1996 | Giannelis et al. | 523/209 |
| 5,578,672 | 11/1996 | Beall et al. | 624/446 |
| 5,659,034 | 8/1997 | DeBord et al. | 546/2 |
| 5,667,886 | 9/1997 | Gough et al. | 428/331 |
| 5,698,624 | 12/1997 | Beall et al. | 524/445 |
| 5,721,306 | 2/1998 | Tsipursky et al. | 524/449 |
| 5,730,996 | 3/1998 | Beall et al. | 424/405 |
| 5,747,403 | 5/1998 | Boyd et al. | 502/62 |
| 5,747,560 | 5/1998 | Christiani et al. | 523/209 |
| 5,760,106 | 6/1998 | Pinnavaia et al. | 523/209 |
| 5,760,121 | 6/1998 | Beall et al. | 524/450 |
| 5,766,751 | 6/1998 | Kotani et al. | 428/323 |
| 5,801,216 | 9/1998 | Pinnavaia et al. | 523/209 |
| 5,804,613 | 9/1998 | Beall et al. | 523/200 |
| 5,830,528 | 11/1998 | Beall et al. | 427/220 |
| 5,837,763 | 11/1998 | Ferraro et al. | 524/449 |
| 5,844,032 | 12/1998 | Serrano et al. | 524/445 |
| 5,849,830 | 12/1998 | Tsipursky et al. | 524/450 |
| 5,853,886 | 12/1998 | Pinnavaia et al. | 428/403 |
| 5,877,248 | 3/1999 | Beall et al. | 524/450 |
| 5,880,197 | 3/1999 | Beall et al. | 524/445 |
| 5,910,523 | 6/1999 | Hudson | 523/213 |
| 5,981,029 | 11/1999 | Harada et al. | 428/143 |
| 5,994,445 | 11/1999 | Kaschel et al. | 524/445 |
| 6,057,396 * | 5/2000 | Lan et al. | 524/445 |
| 6,071,988 | 6/2000 | Barbee et al. | 523/210 |
| 6,084,019 | 7/2000 | Matayabas, Jr. et al. | 524/445 |

OTHER PUBLICATIONS

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvatio Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For ω–Amino Acids By ε–Caprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science*, vol. 7, 1989 Toyko, Japan, pp. 243–251.

Wu, et al., "Structural, thermal, and electrical characterization of layered nanocomposites derived from sodium–montmorillonite and polyethers", *Chemical Abstracts*, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Sanchez Camazano, M. et al., "Factors influencing interactions of organophosphorus pesticides with montmorillonite", *Chemical Abstracts*, vol. 98, No. 19, May 9, 1983, Columbus,–Ohio, US, Abstract No. 156367.

T. Lan, et al., "Clay–Epoxy Nanocomposites:Relationships Between Reinforcement Properties And The Extent Of Clay Layer Exfoliation", *Polym. Mater. Sc. Eng.*, 73, pp. 296–297 (1995).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties Of Nylon 6–Clay Hybrid", J. Mater. Res., vol. 8, No. 5, May 1993, pp. 1185–1189.

K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

* cited by examiner

INTERCALATES FORMED BY CO-INTERCALATION OF ONIUM ION SPACING/COUPLING AGENTS AND MONOMER, OLIGOMER OR POLYMER ETHYLENE VINYL ALCOHOL (EVOH) INTERCALANTS AND NANOCOMPOSITES PREPARED WITH THE INTERCALATES

FIELD OF THE INVENTION

The present invention is directed to intercalated layered materials and, optionally, exfoliates thereof, prepared by contacting, and thereby intercalating, a layered silicate material, e.g., a phyllosilicate, such as a smectite clay, with an alkyl ammonium onium ion, preferably with an alkoxylated onium ion spacing/coupling agent and co-intercalation of the layered material with a melt of ethylene vinyl alcohol (EVOH) (as polymerizable reactants, or as the EVOH oligomer or polymer) to form nanocomposite materials with new and improved gas (particularly $O_2$) barrier properties. The EVOH copolymer can be intercalated in the form of the reactants (ethylene and vinyl acetate polymerizable monomers) or, can be unexpectedly easily intercalated as the EVOH oligomer or polymer by direct compounding, e.g., by combining the onium ion-intercalated layered material and a melt of EVOH in a mixing or extruding device to produce the co-intercalated layered material and the nanocomposite.

The interlaminar spacing of adjacent layers (platelets) of the layered material is expanded at least about 3 Å, preferably at least about 5 Å, to a basal spacing of at least about 13 Å, preferably to at least about 15 Å, and usually to about 18 Å by contacting the layered material with the onium ion spacing/coupling agent for subsequent intercalation with EVOH. The onium ion may be primary, secondary, tertiary or quaternary and preferably is a long chain ($C_6+$) alkoxylated onium ion spacing/coupling agent having at least one binding (ion-exchange) site capable of ion-exchanging or replacing $Li^+$, $Na^+$, $K^+$, $Ca^+$, $Mg^{+2}$, or other inorganic cations that occur within the interlayer spaces between adjacent layers or platelets of the layered materials. The association of the layered material inorganic cations with the onium ion spacing/coupling agent via ion-exchange enables the conversion of the hydrophilic interior clay platelet surfaces to hydrophobic platelet surfaces. Therefore, polymerizable EVOH oligomers, or polymers, or ethylene and vinyl acetate monomers capable of reacting to form EVOH, can be easily intercalated between adjacent platelets of the layered material, e.g., smectite clay platelets.

In accordance with the preferred embodiment of the present invention, the fully polymerized EVOH polymer having a weight average molecular weight between about 100 and about 5 million, preferably about 1,000 to about 500,000, is intercalated between adjacent platelets of the onium ion-treated layered material, preferably simultaneously with dispersing the intercalate into an EVOH matrix polymer, i.e., by direct compounding of the onium ion-treated layered material with the EVOH polymer melt. The co-intercalation of the onium ions and EVOH, or its monomeric reactants, or EVOH polymerizable oligomers, results in a completely homogeneous dispersion of intercalated layered material and/or exfoliated platelets.

Optionally, the nanocomposite material can be sheared to exfoliate up to 100% of the tactoids or platelet clusters into individual platelets, preferably such that more than 80%; or more than 90% by weight of the layered material can be completely exfoliated into single platelet layers. Quick, easy, and completely homogeneous dispersion of the alkoxylated onium ion/EVOH co-intercalated layered material in the EVOH matrix polymer is achieved and the resulting nanocomposite has unexpected $O_2$-impermeability. For example, a film of the EVOH polymer with the layered material, particularly an alkyl ammonium ion-exchanged, preferably alkoxylated onium ion-exchanged, smectite clay can be formed by direct compounding to provide a sheet of the EVOH without any visible intercalate filler that has completely unexpected, extremely low gas permeability. Such films are also effective in reducing the permeability of other gases such as $CO_2$, $H_2O$, and hydrocarbons, such as gasoline vapors, and the like.

The intercalates of the present invention can be dispersed uniformly into EVOH materials to form EVOH polymer/clay intercalate nanocomposites by direct compounding of the onium ion-intercalated clay with sufficient EVOH for intercalation of the clay to form an EVOH intercalated clay, as a concentrate, that can later be mixed with EVOH and/or other polymeric materials to form a nanocomposite. Alternatively, the onium ion-intercalated clay can be intercalated with monomer reactants that are polymerizable to form EVOH to form the EVOH co-intercalate.

In another embodiment of the present invention, the EVOH intercalates can be dispersed in one or more matrix monomers followed by polymerization of the matrix monomer(s), e.g., ethylene and vinyl acetate, with in-situ polymerization of the monomer reactants to form the polymer, in situ, between the platelets of the layered material, and to form the matrix polymer, e.g., by adding a polymerization initiator or catalyst, to form the nanocomposite material. For example, polymerization initiators or catalysts can be directly incorporated into the monomeric EVOH reactants that are intercalated between platelets of the onium ion-intercalated clay followed by polymerization of the EVOH reactant intercalant monomers that have been intercalated into the clay interlayer galleries. In accordance with an important feature of the present invention, if an intercalant EVOH polymer is intercalated into the onium ion-intercalated clay galleries, the EVOH intercalate can be directly compounded with the pristine matrix polymer, preferably an EVOH matrix polymer, to form a nanocomposite easily, while achieving a nanocomposite material with unexpected of gas ($O_2$) impermeability. If the ethylene and vinyl acetate polymerizable intercalant monomers, or a polymerizable EVOH oligomer intercalant is intercalated into the clay galleries, the intercalant(s) can be polymerized together with a desired monomer, oligomer or polymer matrix material, preferably EVOH and the combination then can be compounded to form the nanocomposites.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for bonding the organic molecules with a polymer, for intercalation of the polymer between the layers, thereby substantially increasing the interlayer (interlaminar) spacing between the adjacent silicate layers. The thus-treated, intercalated phyllosilicates, having interlayer spacings increased by at least 3 Å, preferable at least 5 Å, e.g., to an interlayer (interlaminar) spacing of at least about 10–25 Å and up to about 100 Angstroms, then can be exfoliated, e.g., the silicate layers are separated, e.g., mechanically, by high shear mixing. The individual silicate layers, when admixed with a matrix polymer, before, after or during the polymerization of the matrix polymer have been found to substantially improve one or more properties of the polymer, such as mechanical strength and/or high temperature characteristics.

Exemplary prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules.

In accordance with one embodiment of the present invention, intercalates are prepared by contacting a phyllosilicate with a monomeric alkoxylated amine or alkoxylated amide, preferably ethoxylated or propoxylated amine or ethoxylated or propoxylated amide, onium ion spacing/coupling agent compound (hereinafter referred to as an ethoxylated onium ion compound or ethoxylated onium ions). To achieve the full advantage of the present invention, the onium ion should include at least one long chain radical ($C_6$+) that may be aliphatic, straight or branched chain, or aralkyl. Exemplary of such suitable $C_6$+ alkoxylated amine or alkoxylated amide, preferably ethoxylated amine or ethoxylated amide, onium ion molecules (hereinafter referred to as an ethoxylated onium ion compound or ethoxylated onium ions) include primary, secondary, tertiary an quaternary ammonium ions.

In accordance with an important feature of the present invention, best results are achieved by mixing the layered material with the alkoxylated onium ions, e.g., $C_6$+ onium ion spacing/coupling agent, in a concentration of at least about 0.1% by weight, preferably at least about 0.5% by weight alkoxylated onium ion compound, more preferably at least about 1% by weight to about 10% alkoxylated onium ion compound, and most preferably about 2% to about 10% by weight, based on the weight of alkoxylated onium ion compound and carrier (e.g., water, with or without an organic solvent for the onium ion compound) to achieve better sorption of the alkoxylated onium ion spacing/coupling agent compound between the platelets of the layered material. Regardless of the concentration of alkoxylated onium ion compound in the intercalating composition, the weight ratio of EVOH intercalant:layered material should be at least 1:20, preferably at least 1:10, more preferably at least 1:5, and most preferably at least about 1:4 to achieve sufficient EVOH (or its monomeric reactants) intercalation between adjacent inner surfaces of adjacent platelets of the layered material. The ethoxylated onium ion spacing/coupling agent compound sorbed between and bonded to (or complexed with) the silicate platelets via ion-exchange causes surprisingly easy intercalation of the EVOH polymer, or its monomeric reactants for EVOH polymerization in-situ.

In accordance with an important feature of the present invention, it has been found that an alkoxylated onium ion-intercalated phyllosilicate, such as a smectite clay, can be intercalated easily with EVOH to form an ethoxylated onium ion/EVOH co-intercalate that has excellent intercalate dispersibility in a matrix polymer, particularly an EVOH matrix polymer, and has unexpectedly low gas (particularly $O_2$) permeability in an EVOH matrix polymer. The intercalate also can be added to any other matrix polymer to enhance a number of properties of the matrix polymer, including tensile strength, heat distortion temperature, gas-impermeability, elongation, and the like.

The alkoxylated onium ion intercalating process of the present invention provides an intercalate that can be added, particularly by direct compounding (mixing the intercalate directly into a matrix polymer melt) of the intercalate into any matrix polymer, e.g., all market available resin systems, including nylons, such as nylon-6 and nylon 66, and particularly EVOH having any desired ethylene content and degree of saponification. In accordance with one important aspect of the present invention, a concentrate composition can be prepared containing the nanomer, comprising the onium ion-intercalated phyllosilicate (0% EVOH), or the concentrated nanocomposite consisting of the onium ion-intercalated phyllosilicate that has been co-intercalated with EVOH, containing 60–90% by weight EVOH (10–40% by weight nanomer, or onium ion-intercalated phyllosilicate, preferably 15–20% by weight nanomer). The nanomer then can be mixed with EVOH matrix polymer, or the nanocomposite mixed with additional EVOH matrix polymer to provide a composition containing a desired percentage of nanomer, generally about 2–7%, preferably 4–6% by weight nanomer for barrier films having unexpected oxygen impermeability.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes an alkyl onium ion, preferably an alkoxylated onium ion spacing/coupling agent, preferably an alkoxylated onium ion spacing/coupling agent disposed between adjacent platelets of the Layered Material to increase the interlayer spacing between the adjacent platelets at least 3 Å, preferably at least 5 Å, to an interlayer spacing, for example, of at least about 13 Å, preferably at least about 15 Å, e.g., 18 Å; and after EVOH co-intercalation, the d-spacing is increased to at least about 20 Å, preferably to 25 Å to 35 Å, e.g., 28 Å.

"Intercalation" shall mean a process for forming an Intercalate.

"Alkoxylated Onium Ion Spacing/Coupling Agent" or "Alkoxylated Onium Ion Compound" shall mean an organic compound that includes at least one ether linkage, R—O—R, and a positively charged nitrogen atom, preferably a quaternary ammonium compound, and when dissolved in water and/or an organic solvent, an anion dissociates from the alkoxylated onium ion spacing/coupling agent leaving an alkoxylated, e.g., ethoxylated or propoxylated, onium cation that can ion-exchange with a silicate platelet exchangeable cation, e.g., $Na^+$, $Ca^{+2}$, $Li^+$, $Mg^{+2}$, or $K^+$.

"EVOH" shall mean a co-polymer of ethylene and vinyl acetate monomer reactants polymerized and hydrolyzed to an ethylene vinyl alcohol oligomer or polymer or a prepolymer (oligomer) of ethylene vinyl alcohol that can react and/or polymerize with polymerization initiators or catalysts to yield an EVOH polymer. The polymer, monomer reactants, or prepolymer (oligomer) shall be a co-polymer of ethylene and vinyl acetate hydrolyzed to ethylene vinyl alcohol.

"Co-intercalation" shall mean a process for forming an intercalate by intercalation of an alkoxylated onium ion spacing/coupling agent and, at the same time or separately, intercalation of an EVOH polymer, or intercalation of polymerizable monomers capable of reacting and polymerizing to form an EVOH polymer, or intercalation of an EVOH oligomer.

"Concentrate" shall mean an intercalate or exfoliate, formed by intercalation of EVOH into a layered silicate material, to form a concentrate comprising 10–90% EVOH intercalant polymer and 10–90% intercalated layered silicate material. The concentrate is later diluted with EVOH matrix polymer to form a desirable ratio of intercalate or exfoliate in EVOH matrix polymer.

"Intercalating Carrier" shall mean a carrier comprising water and/or an organic solvent used with the alkoxylated onium ion spacing/coupling agent and/or with the EVOH intercalant monomer/oligomer or polymer to form an Intercalating Composition capable of achieving Intercalation of the alkoxylated onium ion spacing/coupling agent and, at the same time or subsequently, intercalation of the EVOH polymer or monomer reactants between platelets of the Layered Material.

"Intercalating Composition" or "Intercalant Composition" shall mean a composition comprising an alkoxylated onium ion spacing/coupling agent and/or EVOH Intercalants, and a layered Material, with or without an Intercalating Carrier.

"Exfoliate" or "Exfoliated" shall mean individual platelets of an Intercalated Layered Material or tactoids or clusters of individual platelets, e.g., 2–10 platelets, preferably 2–5 platelets, that are smaller in total thickness than the non-exfoliated Layered Material, dispersed as individual platelets or tactoids throughout a carrier material, such as water, an alcohol or glycol, or any other organic solvent, or throughout a matrix, oligomer or polymer, such as EVOH.

"Exfoliation" shall mean a process for forming an Exfoliate from an Intercalate.

"Matrix Polymer" shall mean a thermoplastic or thermosetting polymer that the Intercalate or Exfoliate is dispersed within to improve the mechanical strength, thermal resistance, and/or, particularly, the gas ($O_2$) impermeability of the Matrix Polymer, preferably EVOH.

SUMMARY OF THE INVENTION

In brief, the present invention is directed to intercalated layered materials prepared by co-intercalation of an alkoxylated onium ion and EVOH between the planar layers of a swellable layered material, such as a phyllosilicate, preferably a smectite clay. The spacing of adjacent layers of the layered materials is expanded at least about 3 Å, preferably at least about 5 Å, to at least about 13 Å, preferably to at least about 15 Å, usually to about 15–30 Å, e.g., 18 Å with an alkoxylated onium ion spacing/coupling agent. The intercalation of the EVOH polymer then increases the d-spacing of adjacent layers to at least about 20 Å, preferably about 25 Å to about 35 Å, generally about 28 Å.

As shown in the examples, an EVOH film that does not include the intercalates and/or exfoliates of the present invention has an oxygen permeability of about 0.01 to about 0.16 cc/100 $in^2$/day, at atmospheric pressure, and a relative humidity (RH) of 65% over a test period of 400 hours. By incorporating only 5% by weight of the intercalates and/or exfoliates (nanomers) of the present invention, the oxygen permeability is reduced to about 0.002 to about 0.04 cc/100 $in^2$/day (less than ⅓ of the oxygen permeability).

The present invention is directed to a method of preparing intercalated layered materials prepared by co-intercalation of alkoxylated onium ion spacing/coupling agents and EVOH into the galleries of the layered materials to form intercalates or intercalate concentrate compositions that provide new and unexpected gas, particularly oxygen, impermeability when incorporated into, as by direct compounding with, matrix polymers, particularly EVOH.

The present invention also is directed to the intercalates and exfoliates prepared from the intercalate or intercalate concentrate compositions. The exfoliate can be prepared by adding the concentrate to polymerizable monomer/oligomer, or adding the polymer, e.g., EVOH, and then curing. The presence of polymerizable monomer or oligomer in the galleries of the layered materials makes the layered materials compatible to the parent matrix polymer, e.g., EVOH, when the intercalate is added to additional matrix polymer that is the same as the monomer or oligomer intercalated. Therefore, for example, when mixed with more EVOH, the layered materials are unexpectedly ready to be dispersed or exfoliated in the EVOH matrix polymer. When a polymer polymerization initiator or catalyst is added, the layered materials may be exfoliated by virtue of the expanding, polymerizing EVOH monomer and resulting polymer molecules dispersed between platelet layers, depending upon the degree of polymerization achieved. The exfoliated individual layers and tactoids of the layered materials will perform as a polymer reinforcement and molecule (gas) barrier in a matrix polymer to improve the mechanical properties and barrier properties, e.g., gas impermeability, of the matrix polymer. The exfoliate also can be prepared by directly adding a polymerization initiator or catalyst to the monomer/-oligomer/or polymer/intercalated concentrate.

Addition of the alkoxylated onium ion-treated layered silicate/EVOH intercalate to a polymer melt enhances one or more properties, such as strength or temperature resistance, and particularly gas impermeability. The intercalate is easily, homogeneously and uniformly dispersed throughout the matrix polymer to achieve new and unexpected gas barrier properties to matrix polymers, particularly EVOH.

DETAILED DESCRIPTION OF THE PREFERRED EMBODIMENTS

To form the intercalated and exfoliated materials of the present invention, the layered material, e.g., the phyllosilicate, should be swelled or intercalated, in the preferred embodiment, by sorption of an alkoxylated, e.g., ethoxylated or propoxylated, onium ion spacing/coupling agent and, simultaneously or subsequently intercalated with EVOH.

While the invention described herein is disclosed by way of the preferred embodiment via expanding the interlaminar spacing between adjacent platelets of a layered silicate material, e.g., a phyllosilicate, by first intercalating alkoxylated onium ions between the silicate platelets, prior to or simultaneously with intercalating an EVOH intercalant, it should be understood that the EVOH intercalant can be intercalated between and complexed to the internal platelet faces by other well known mechanisms, such as the dipole/ dipole (direct intercalation of the EVOH oligomer or polymer) method disclosed in this Assignee's U.S. Pat. Nos. 5,880,197 and 5,877,248, hereby incorporated by reference; and by intercalating a silane coupling agent, or by the acidification technique, by substitution with hydrogen (ion-exchanging the interlayer cations with hydrogen by use of an acid or ion-exchange resin) as disclosed in the Deguchi U.S. Pat. No. 5,102,948, and in the Pinnavaia, et al. U.S. Pat. No. 5,853,886, hereby incorporated by reference.

Sorption of the alkoxylated onium ion spacing/coupling agent should be sufficient to achieve expansion of the interlayer spacing of adjacent platelets of the layered material (when measured dry) at least about 3 Å, preferably at least about 5 Å, and intercalation of both the alkoxylated onium ion spacing/coupling agent and EVOH should achieve an interlayer spacing of at least about 10 Å, preferably at least about 15 Å.

The alkoxylated onium ion spacing/coupling agent is introduced into the layered material galleries in the form of a solid or liquid composition (neat or aqueous, with or without an organic solvent, e.g., an alcohol, such as ethanol or propanol to, if necessary, aid to dissolve the alkoxylated onium ion compound) having an alkoxylated onium ion spacing/coupling agent concentration sufficient to provide a concentration of about 5% to about 10% by weight clay (90–95% water) and the alkoxylated onium ion compound is dissolved in the clay slurry water, preferably at a molar ratio of alkoxylated onium ions to exchangeable interlayer cations of at least about 0.5:1, more preferably at least about 1:1. The alkoxylated onium ion-intercalated clay then is separated from the water easily, since the clay is now hydrophobic, and dried in an oven to less than 5% water, preferably bone dry, before being compounded with the EVOH for EVOH intercalation and compounding. The alkoxylated onium ion spacing/coupling agent compound can be added as a solid with the addition to the layered material onium ion compound blend of preferably at least about 20% water, more preferably at least about 30% water or more, based on the dry weight of layered material. Preferably about 30% to about 50% water, more preferably about 30% to about 40% water, based on the dry weight of the layered material, is included in the alkoxylated onium ion intercalating composition, so that less water is sorbed by the intercalate, thereby necessitating less drying energy after alkoxylated onium ion intercalation.

The alkoxylated onium ion spacing/coupling agent cations intercalated via ion-exchange into the interlayer spaces between adjacent layered material platelets are primary, secondary, tertiary or quaternary onium ions having the following preferred structure of Formula 1:

Formula 1

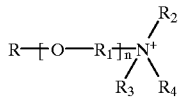

wherein R, $R_2$, $R_3$ and R4 are H or organic moieties, such as linear or branched alkyl, aryl or aralkyl moieties having 1 to about 24 carbon atoms. $R_1=(CH_2)_{1-6}$; n=1–30, preferably 1–10; preferably at least one of R, $R_2$, $R_3$, and $R_4$ has at least six carbon atoms.

Additional useful multi-charged spacing/coupling agents include for example, tetra-, tri-, and di-onium species such as tetra-ammonium, tri-ammonium, and di-ammonium (primary, secondary, tertiary, and quaternary), derivatives of aliphatic, aromatic or arylaliphatic amines, phosphines, esters, alcohols and sulfides. Illustrative of such materials are di-onium compounds of the formula:

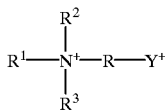

wherein Y can be a N, S, P, or O-containing moiety, R is an organic spacing, backbone radical, straight or branched, preferably having from 2 to 24, more preferably 3 to 10 carbon atoms, in a backbone organic spacing molecule covalently bonded at its ends to charged $N^+$ cations and $R^1$, $R^2$, and $R^3$, (same or different) can be hydrogen, or an alkyl radical of 1 to 22 carbon atoms, linear or branched, preferably at least one of $R^1$, $R^2$ and $R^3$ has at least 6 carbon atoms. Examples of R include substituted or unsubstituted alkylene, cycloalkenylene, cycloalkylene, arylene, alkylarylene, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Examples of $R^1$, $R^2$, and $R^3$ include non-existent; H; alkyl having 1 to 22 carbon atoms, straight chain or branched; cycloalkenyl; cycloalkyl; aryl; alkylaryl, either unsubstituted or substituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Illustrative of useful R groups are alkylenes, such as methylene, ethylene, octylene, nonylene, tert-butylene, neopentylene, isopropylene, sec-butylene, dodecylene and the like; alkenylenes such as 1-propenylene, 1-butenylene, 1-pentenylene, 1-hexenylene, 1-heptenylene, 1-octenylene and the like; cycloalkenylenes such as cyclohexenylene, cyclopentenylene and the like; alkanoylalkylenes such as butanoyl octadecylene, pentanoyl nonadecylene, octanoyl pentadecylene, ethanoyl undecylene, propanoyl hexadecylene and the like; alkylaminoalkylenes, such as methylamino octadecylene, ethylamino pentadecylene, butylamino nonadecylene and the like; dialkylaminoalkylene, such as dimethylamino octadecylene, methylethylamino nonadecylene and the like; arylaminoalkylenes such as phenylamino octadecylene, p-methylphenylamino nonadecylene and the like; diarylaminoalkylenes, such as diphenylamino pentadecylene, p-nitrophenyl-p'-methylphenylamino octadecylene and the like; alkylarylaminoalkylenes, such as 2-phenyl-4-methylamino pentadecylene and the like; alkylsulfinylenes, alkylsulfonylenes, alkylthio, arylthio, arylsulfinylenes, and arylsulfonylenes such as butylthio octadecylene, neopentylthio pentadecylene, methylsulfinyl nonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene and the like; alkoxycarbonylalkylenes such as methoxycarbonylene, ethoxycarbonylene, butoxycarbonylene and the like; cycloalkylenes such as cyclohexylene, cyclopentylene, cyclo-octylene, cycloheptylene and the like; alkoxyalkylenes such as methoxy-methylene, ethoxymethylene, butoxymethylene, propoxyethylene, pentoxybutylene and the like; aryloxyalkylenes and aryloxyarylenes such as phenoxyphenylene, phenoxymethylene and the like; aryloryalkylenes such as phenoxydecylene, phenoxyoctylene and the like; arylalkylenes such as benzylene, phenthylene, 8-phenyloctylene, 10-phenyldecylene and the like; alkylarylenes such as 3-decylphenylene, 4-octylphenylene, 4-nonylphenylene and the like; and polypropylene glycol and polyethylene glycol substituents such as ethylene, propylene, butylene, phenylene, benzylene, tolylene, p-styrylene, p-phenylmethylene, octylene, dodecylene, octadecylene, methoxy-ethylene, moieties of the formula —$C_3H_6COO$—, —$C_5H_{10}COO$—, —$C_7H_{10}COO$—, —$C_7H_{14}COO$—, —$C_9H_{18}COO$—, —$C_{11}H_{22}COO$—, —$C_{13}H_{26}COO$—, —$C_{15}H_{30}COO$—, and —$C_{17}H_{34}COO$— and —$C$=$C(CH_3)COOCH_2CH_2$—, and the like. Such tetra-, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium radicals are well known in the art and can be derived from the corresponding amines, phosphines, alcohols or ethers, and sulfides.

In accordance with one embodiment of the present invention, the multi-charged spacing/coupling agent compounds are alkoxylated multi-onium ion compounds that include at least two primary, secondary, tertiary or quaternary ammonium ions having Formula 2, as follows:

Formula 2

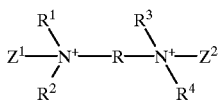

wherein R is an alkylene, aralkylene or substituted alkylene spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/100 grams C.E.C.) layered materials. R can be straight or branched chain, including mixtures of such moieties, i.e., $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R_4$ are moieties, same or different, selected from the group consisting of hydrogen, alkyl, alkyl, benzyl, substituted benzyl, e.g., straight or branched chain alkyl-substituted and halogen-substituted; alkoxylated, ethoxylated or propoxylated alkyl; ethoxylated or propoxylated benzyl, e.g., 1–10 moles of ethoxylation or 1–10 moles of propoxylation. $Z^1$ and $Z^2$, same or different, may be non-existent, or may be any of the moieties described for $R^1$, $R^2$, $R^3$ or $R^4$. Preferably, at least one of $R^1$, $R^2$, $R^3$ and $R^4$ is alkoxylated. Also, one or both of $Z^1$ and $Z^2$ may include one or more positively charged atoms or onium ion molecules.

Any swellable layered material that sufficiently sorbs the onium ion spacing/coupling agent to increase the interlayer spacing between adjacent phyllosilicate platelets at least about 3 Å, preferably at least about 5 Å, can be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Preferred swellable layered materials are phyllosilicates of the 2:1 type having an ion-exchange capacity of 40–200 meq/100 grams and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The preferred clay materials generally include interlayer cations such as $Na^+$, $Ca^{+2}$, $K^+$, $Mg^{+2}$, $NH_4^+$ and the like, including mixtures thereof.

The amount of alkoxylated onium ion spacing/coupling agent intercalated into the swellable layered materials, in order that the intercalated layered material platelet surfaces sufficiently complex or bond via ion-exchange to the onium ion spacing/coupling agent molecules such that the layered material may be sufficiently spaced for easy intercalation of EVOH or its monomeric/oligomeric reactants, may vary substantially between about 2%, preferably at least about 10%, and up to 100%, based on the dry weight of the layered material. In the preferred embodiments of the invention, amounts of onium ion employed, with respect to the dry weight of layered material being intercalated, will preferably range from about 8 grams of alkoxylated onium ion spacing/coupling agent compound:100 grams of layered material (dry basis), preferably at least about 10 grams of alkoxylated onium ion spacing/coupling agent compound:100 grams of layered material to about 40–60 grams of alkoxylated onium ion spacing/coupling agent compound:100 grams of layered material. More preferred amounts are from about 20 grams of alkoxylated onium ion spacing/coupling agent compound:100 grams of layered material to about 60 grams of alkoxylated onium ion spacing/coupling agent compound: 100 grams of layered material (dry basis).

The alkoxylated onium ions and EVOH intercalants may be introduced into (sorbed within) the interlayer spaces of the layered material in a number of ways. In a preferred method of intercalating the alkoxylated onium ions between adjacent platelets of the layered material, the layered material is slurried in water, e.g., at 5–20% by weight layered material and 80–95% by weight water, and the alkoxylated onium ion compound is dissolved in the water in which the layered material is slurried. If necessary, the alkoxylated onium ion compound can be dissolved first in an organic solvent, e.g., propanol. The layered material then is separated from the slurry water and dried prior to compounding with EVOH for intercalation of the EVOH and to form the nanocomposite material in EVOH matrix polymer. In a preferred method of intercalating the EVOH, the alkoxylated onium ion-treated layered material is intimately mixed with the EVOH, e.g., by extrusion or pug milling, to form an intercalating composition comprising the alkoxylated onium ion-intercalated layered material and EVOH polymer.

To achieve sufficient intercalation of the alkoxylated onium ions between adjacent platelets of the layered material, the layered material and alkoxylated onium ion intercalating composition contains at least about 5% by weight, preferably at least about 10% by weight alkoxylated onium ion compound, based on the dry weight of the layered material, so that the resulting alkoxylated onium ion-intercalated layered material has interior platelet surfaces that are sufficiently hydrophobic and sufficiently spaced for intercalation of the EVOH oligomer or polymer. The alkoxylated onium ion carrier (preferably water, with or without an organic solvent) can be added by first solubilizing or dispersing the alkoxylated onium ion compound in the carrier; or a dry alkoxylated onium ion compound and relatively dry phyllosilicate (preferably containing at least about 4% by weight water) can be blended and the intercalating carrier added to the blend, or to the phyllosilicate prior to adding the dry alkoxylated onium ion. When intercalating the phyllosilicate with alkoxylated onium ions in slurry form (e.g., 900 pounds water, 100 pounds phyllosilicate, 100 pounds alkoxylated onium ion compound), the amount of water can vary substantially, e.g., from about 4% by weight, preferably from a minimum of at least about 30% by weight water, with no upper limit to the amount of water in the intercalating composition (the phyllosilicate intercalate is easily separated from the intercalating composition due to its hydrophobicity after alkoxylated onium ion treatment).

Alternatively, the alkoxylated onium ion intercalating carrier, e.g., water, with or without an organic solvent, can be added directly to the phyllosilicate prior to adding the alkoxylated onium ion compound, either dry or in solution. Sorption of the alkoxylated onium ion compound molecules may be performed by exposing the layered material to a dry or liquid alkoxylated onium ion compound in the alkoxylated onium ion intercalating composition containing at least about 2% by weight, preferably at least about 5% by weight alkoxylated onium ion compound, more preferably at least about 10% alkoxylated onium ion compound, based on the dry weight of the layered material.

In accordance with another method of intercalating the alkoxylated onium ions and EVOH between the platelets of the layered material, the layered material, preferably containing at least about 4% by weight water, more preferably about 10% to about 15% by weight water, is blended with water and/or organic solvent solution of an alkoxylated onium ion spacing/coupling agent compound in a ratio sufficient to provide at least about 5% by weight, preferably at least about 10% by weight alkoxylated onium ion compound, based on the dry weight of the layered material. The alkoxylated onium ion compound can be intercalated into the layered material simultaneously with the intercalation of the EVOH, or the EVOH may be intercalated after intercalation of the alkoxylated onium ion spacing/coupling agent. The dry alkoxylated onium ion-intercalated clay then is extruded with EVOH for direct compounding, with intercalation, of the EVOH into the alkoxylated onium ion-intercalated layered material.

The alkoxylated onium ion spacing/coupling agents have an affinity for the phyllosilicate so that they are sorbed between, and are ion-exchanged with the cations on the inner surfaces of the silicate platelets, in the interlayer spaces.

In order to achieve compatibility between the EVOH intercalant and the clay platelets surfaces without EVOH degradation (see U.S. Pat. No. 5,844,032) without requiring previous platelet complexing with an organic solvent, it has been found that the layered material should be intercalated with an alkoxylated amine or alkoxylated amide onium ion.

Suitable alkoxylated amine onium ions have the general Formula 3:

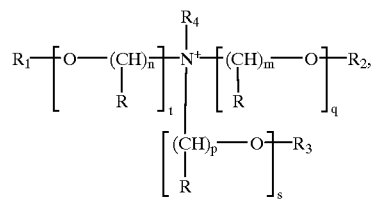

Formula 3 wherein each R (same or different) is $CH_3$ or H, wherein n, m, and p (same or different)=2, 3 or 4, linear or branched, and q, s, and t (same or different)=1–10, and wherein two of q, s, and t can be 0; $R_1$, $R_2$, $R_3$ and $R_4$ (same or different)=H, $C_{1-6}$ or phenyl.

Suitable alkoxylated diamine onium ons have the general Formula 4:

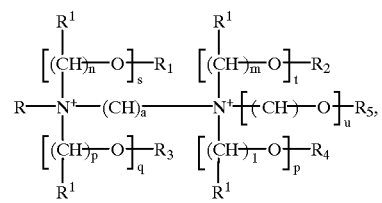

Formula 4 wherein each $R^1$, same or different, is $CH_3$ or H;
a=1–10;
l, m, n, and p (same or different)=2, 3, or 4, linear or branched,
p, q, s, and t (same or different)=0–10, wherein at least one of p, q, s, and t is not zero.
$R_1$, $R_2$, $R_3$, $R_4$, $R_5$ (same or different)=H, alkali metal, $C_{1-6}$ or phenyl; and
wherein R is $C_{1-24}$, preferably $C_6+$, or phenyl.
Examples include the following:

| ALKOXYLATED AMINES |
| --- |
| Dilaureth-4 Dimonium Chloride |
| Disteareth-6 Dimonium Chloride |
| Ethyl PEG-15 Cocamine Sulfate |
| PEG-2 Cocamine |
| PEG-3 Cocamine |
| PEG-5 Cocamine |
| PEG-10 Cocamine |
| PEG-15 Cocamine |
| PEG-15 Cocomonium Chloride |
| PEG-15 Cocopolyamine |
| PEG-2 Oleamine |
| PEG-5 Oleamine |
| PEG-15 Oleamine |
| PEG-30 Oleamine |
| PEG-15 Oleamonium Chloride |
| PEG-8 Palmitoyl Methyl Diethonium Methosulfate |
| PEG-2-Soyamine |
| PEG-5 Soyamine |
| PEG-8 Soyamine |
| PEG-10 Soyamine |
| PEG-15 Soyamine |
| PEG-2 Stearamine |
| PEG-5 Stearamine |
| PEG-10 Stearamine |
| PEG-15 Stearamine |
| PEG-50 Stearamine |

| ALKOXYLATED AMINES |
|---|
| PEG-15 Stearmonium Chloride |
| PEG-5 Stearyl Ammonium Chloride |
| PEG-5 Stearyl Ammonium Lactate |
| PEG-2 Tallow Amine |
| PEG-5 Tallow Amine |
| PEG-8 Tallow Amine |
| PEG-15 Tallow Amine |
| PEG-20 Tallow Amine |
| PEG-30 Tallow Amine |
| PEG-40 Tallow Amine |
| PEG-50 Tallow Amine |
| PEG-3 Tallow Aminopropylamine |
| PEG-10 tallow Aminopropylamine |
| PEG-15 Tallow Aminopropylamine |
| PEG-15 Tallow Polyamine |
| Poloxamine 304 |
| Poloxamine 504 |
| Poloxamine 701 |
| Poloxamine 702 |
| Poloxamine 704 |
| Poloxamine 707 |
| Poloxamine 901 |
| Poloxamine 904 |
| Poloxamine 908 |
| Poloxamine 1101 |
| Poloxamine 1102 |
| Poloxamine 1103 |
| Poloxamine 1104 |
| Poloxamine 1301 |
| Poloxamine 1302 |
| Poloxamine 1304 |
| Poloxamine 1307 |
| Poloxamine 1501 |
| Poloxamine 1502 |
| Poloxamine 1504 |
| Poloxamine 1508 |
| Polyquaternium-1 |
| PPG-9 Diethylmonium Chloride |
| PPG-25 Diethylmonium Chloride |
| PPG-40 Diethylmonium Chloride |
| Quaternium-16 |
| Quaternium-22 |
| Quaternium-53 |
| Quaternium-53 |
| Quaternium-56 |

Alkylamido Alkylamines

This large group of amphoteric materials exhibits the structure:

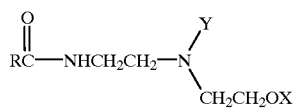

R is $C_{1-24}$, preferably $C_{1-6}$ or phenyl, where X may be hydrogen or —CH2COO⁻Na⁺ and where Y may be —$CH_2COO^-Na^+$ or —$CH_2CH_2COO^-Na^+$, or —$CH_2CHOHCH_2SO_3^-Na^+$, or —$CH_2CHOHCH_2OPO_3H^-Na^+$.

Cocoamphodipropionic Acid
DEA-Cocoamphodipropionate
Disodium Caproamphodiacetate
Disodium Caproamphodipropionate
Disodium Caprylamphodiacetate
Disodium Caprylamphodi-
propionate
Disodium Cocoamphodiacetate
Disodium Cocamphodipropionate
Disodium Cocamphocarboxyethyl-
hydroxypropylsulfonate
Disodium Isostearoamphodi-
propionate
Disodium Lauroamphodiacetate
Disodium Lauroamphodipropionate
Disodium Oleoamphodipropionate
Disodium Stearoamphodiacetate
Lauroamphodipropionic Acid
Sodium Caproamphoacetate
Sodium Caproamphohydroxy-
propylsulfonate
Sodium Caproamphopropionate
Sodium Caprylamphoacetate
Sodium Caprylamphohy-
droxypropylsulfonate
Sodium Caprylamphopropionate
Sodium Cocoamphoacetate
Sodium Cocoamphopropylsulfonate
Sodium Cocoamphopropionate
Sodium Isostearoamphoacetate
Sodium Isostearoamphopropionate
Sodium Lauroamphoacetate
Sodium Lauroamphoglycino-
hydroxypropyl Phosphate
Sodium Lauroamphopropionate
Sodium Myristoamphoacetate
Sodium Oleoamphoacetate
Sodium Oleoamphodydroxy-
propylsulfonate
Sodium Oleoamphopropionate
Sodium Ricinoleoamphoacetate
Sodium Stearoamphoacetate
Sodium Stearoamphohydroxy-
propylsulfonate
Sodium Stearoamphopropionate
Sodium Tallamphopropionate
Sodium Tallowamphoacetate
Sodium Undecylenoamphoacetate

| POLYETHOXYLATED AMINES |
|---|
| Bis(2-hydroxyethyl) cocoamine |
| Polyoxyethylene (5) cocoamine |
| Polyoxyethylene (10) cocoamine |
| Polyoxyethylene (15) cocoamine |
| Bis(2-hydroxyethyl) octadecylamine |
| Polyoxyethylene (5) octadecylamine |
| Polyoxyethylene (10) octadecylamine |
| Polyoxyethylene (15) octadecylamine |
| Polyoxyethylene (50) octadecylamine |
| Bis(2-hydroxyethyl) tallowamine |
| Polyoxyethylene (5) tallowamine |
| Polyoxyethylene (15) tallowamine |
| Polyoxyethylene (50) tallowamine |
| Bis(2-hydroxyethyl) oleylamine |
| Polyoxyethylene (5) oleylamine |
| Polyoxyethylene (15) oleylamine |
| Bis(2-hydroxyethyl) soyaamine |
| Polyoxyethylene (10) soyaamine |
| Polyoxyethylene (15) soyaamine |

Polyethoxylated Diamines

N,N',N'-tris(2-hydroxyethyl)-N-tallow-1,3-diaminopropane
N,N',N'-polyoxyethylene (10)-N-tallow-1,3-diaminopropane
N,N',N'-polyoxyethylene (15)-N-tallow-1,3-diaminopropane Polyethoxylated Amides Polyoxyethylene(12.5)(hydrogenated-tallow)amide
Polyoxyethylene(5)oleamide Polyethoxylated Quaternary Ammonium Salts Methylbis(2-hydroxyethyl)cocoammonium chloride
Methylpolyoxyethylene(15)cocoammonium chloride
Methylbis(2-hydroxyethyl)octadecylammonium chloride
Methylpolyoxyethylene(15)octadecylammonium chloride
Methylbis(2-hydroxyethyl)oleylammonium chloride
Methylpolyoxyethylene(15)oleylammonium chloride Polyethoxylated Diamines N,N$^1$-tris(2-hydroxyethyl)-N-tallow-1,3-diaminopropane
N,N$^1$-polyoxyethylene(10)-N-tallow-1,3-diaminopropane
N,N$^1$-polyoxyethylene(15)-N-tallow-1,3-diaminopropane
N,N$^1$-tris(2-hydroxyethyl)-N-tallow-1,3-diaminopropane Polyethoxylated Amides Polyoxyethylene(5)oleamide
Polyoxyethylene(5)(hydrogenated-tallow)amide
Polyoxyethylene(50)(hydrogenated-tallow)amide Polyethoxylated Quaternary Ammonium Salts Methylbis(2-hydroxyethyl)cocoammonium chloride
Methylpolyoxyethylene(15)oleylammonium chloride
Methylbis(2-hydroxyethyl)oleylammonium chloride
Methylpolyoxyethylene(15)oleylammonium chloride
Methylbis(2-hydroxyethyl)octadecylammonium chloride
Methylpolyoxyethylene(15)octadecylammonium chloride Ethoxylated Ether Amines

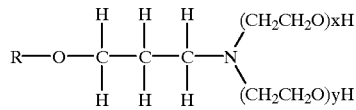

R is $C_{1-24}$, preferably $C_{1-6}$, or phenyl.

---

N-bis-(2-hydroxyethyl)-
3-isodecyloxy-propylamine
N-poly (5) oxyethylene-
3-isodecyloxy-propylamine
N-bis-(2-hydroxyethyl)-
3-isotridecyloxy-propylamine
N-poly (5) oxyethylene-
3-isotridecyloxy-propylamine
N-bis-(2-hydroxyethyl)-
3-$C_{12}$/$C_{15}$-alkoxy-propylamine
N-bis-(2-hydroxyethyl)-
3-octadecyloxy-propylamine

---

Primary Ether Amines

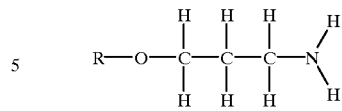

R is $C_{1-24}$, preferably $C_{1-6}$, or phenyl.

---

3-isopropyloxy-propylamine
3-isohexyloxy-propylamine
3-(2-ethylhexyloxy)-propylamine
3-(octyl/decyloxy)-propylamine
3-isodecyloxy-propylamine
3-isododecyloxy-propylamine
3-(dodecyl/tetradecyloxy)-propylamine
3-isotridecyloxy-propylamine
3-tetradecyloxyl-propylamine
3-(tetradecyl/dodecyloxy)-propylamine
3-($C_{12}$/$C_{15}$ alkyloxy)-propylamine
3-(octadecyl/hexadecyloxy)-propylamine

---

Ether Amine Amphoterics

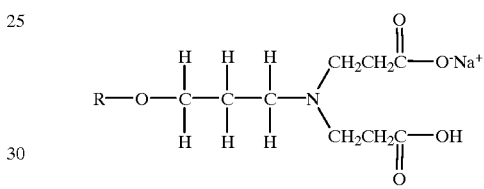

R is $C_{1-24}$, preferably $C_{1-6}$, or phenyl.

---

Amphoteric 400
Alkali Surfactant NM
Amphoteric N
Amphoteric SC
Amphoteric TC

---

Ether Amine Quaternaries

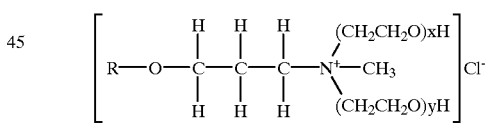

R is $C_{1-24}$, preferably $C_{1-6}$, or phenyl.

---

3-isodecyloxypropyl
dihydroxyethyl methyl
ammonium chloride
3-isodecyloxypropyl
dihydroxyethyl methyl
ammonium cloride
3-isotridecyoxyypropyl
dihyroxyethyl methyl
ammonium chloride
3-isotridecyloxylpropyl
dihydroxyethyl methyl
ammonium chloride
3-isotridecyloxypropyl
poly (5) oxyethylene methyl
ammonium chloride Ether Diamines

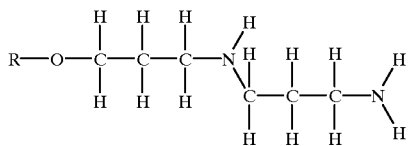

R is $C_{1-24}$, preferably $C_{1-6}$, or phenyl.

N-(octyl/decyloxypropyl)-1,3-diaminopropane
N-isodecyloxypropyl-1,3-diaminopropane
N-isododecyloxypropyl-1,3-diaminopropane
N-(dodecyl/tetradecyloxypropyl)-1,3-diaminopropane
N-(isotridecyloxypropyl)-1,3-diaminopropane
N-(tetradecyloxypropyl)-1,3-diaminopropane It is preferred that the alkoxylated onium ion/EVOH intercalate loading be less than about 10% for purposes of increasing the viscosity of an organic liquid carrier. Intercalate loadings within the range of about 0.05% to about 40% by weight, preferably about 0.5% to about 20%, more preferably about 1% to about 10% significantly enhances viscosity. In general, the amount of intercalate and/or exfoliated particles thereof incorporated into a liquid carrier, such as a polar solvent, e.g., a glycol such as glycerol, is less than about 90% by weight of the mixture, and preferably from about 0.01% to about 80% by weight of the composite material mixture, more preferably from about 0.05% to about 40% by weight of the mixture, and most preferably from about 0.05% to about 20% or 0.05% to about 10% by weight.

In accordance with a preferred embodiment of the present invention, the alkoxylated onium ion-intercalated layered material can be intercalated with EVOH and simultaneously or subsequently dispersed into one or more melt-processible thermoplastic and/or thermosetting matrix oligomers or polymers, or mixtures thereof, by any method, preferably by direct compounding. Matrix polymers for use in this embodiment of the process of this invention may vary widely, the only requirement is that they are melt processible. In this embodiment of the invention, the polymer, e.g., EVOH, includes at least ten (10), preferably at least thirty (30) recurring monomeric units. The upper limit to the number of recurring monomeric units is not critical, provided that the melt index of the matrix polymer under use conditions is such that the matrix polymer forms a flowable mixture. Most preferably, the matrix polymer is EVOH that is intercalated into the onium ion-intercalated layered material simultaneously with dispersing the EVOH-intercalated clay uniformly into the EVOH matrix polymer, e.g., by intimate mixing with an EVOH melt (direct compounding). The EVOH matrix polymer or oligomer preferably includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

The alkoxylated onium ion co-intercalating process of the present invention provides an intercalate that can be added, particularly by direct compounding (mixing the intercalate directly into a matrix polymer melt) of the intercalate into any matrix polymer, e.g., all market available resin systems, including nylons, such as nylon-6 and nylon 66, and particularly EVOH having any desired ethylene content and degree of saponification. In accordance with one important aspect of the present invention, a concentrate composition can be prepared containing the nanomer, comprising the onium ion-intercalated phyllosilicate (0% EVOH), or the concentrated nanocomposite consisting of the onium ion-intercalated phyllosilicate that has been co-intercalated with EVOH, containing 60–90% by weight EVOH (10–40% by weight nanomer, or onium ion-intercalated phyllosilicate, preferably 15–20% by weight nanomer).

Other thermoplastic resins and rubbers for use as matrix monomers, oligomers or polymers in the practice of this invention may vary widely. Illustrative of useful thermoplastic resins, which may be used alone or in admixture, are polyactones such as poly(pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly (tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl) carbonate], poly[1,1-ether bis(4-phenyl)carbonate], poly [diphenylmethane bis(4-phenyl)carbonate], poly[1,1-cyclohexane bis(4-phenyl)carbonate] and the like; polysulfones; polyethers; polyketones; polyamides such as poly(4-amino butyric acid), poly(hexamethylene adipamide), poly(6-aminohexanoic acid), poly(m-xylylene adipamide) or EVOH, poly(p-xylylene sebacamide), poly(2, 2,2-trimethyl hexamethylene terephthalamide), poly (metaphenylene isophthalamide) (NOMEX), poly(p-phenylene terephthalamide) (KEVLAR), and the like; polyesters such as poly(ethylene azelate), poly(ethylene-1, 5-naphthalate), poly(1,4-cyclohexane dimethylene terephthalate), poly(ethylene oxybenzoate) (A-TELL), poly (para-hydroxybenzoate) (EKONOL), poly(1,4-cyclohexylidene dimethylene terephthalate) (KODEL) (cis), poly(1,4-cyclohexylidene dimethylene terephthalate) (KODEL) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); poly (urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexyl-methane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers in the practice of this embodiment of the invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly(styrene)-poly(butadiene)-poly(styrene) block copolymer manufactured by Shell Chemical Company under the trade name KRATON®.

Most preferred thermoplastic polymers for use as a matrix polymer are thermoplastic polymers such as EVOH, or polyamides, particularly nylons, such as nylon MXD6. Polyamides which may be used as matrix polymers in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

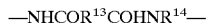

—NHCOR$^{13}$COHNR$^{14}$— in which R$^{13}$ is an alkylene group of at least 2 carbon atoms, preferably from about 2 to about 11; or arylene having at least about 6 carbon atoms, preferably about 6 to about 17 carbon atoms; and R$^{14}$ is selected from R$^{13}$ and aryl groups. Also, included are copolyamides and terpolyamides obtained by known methods, for example, by condensation of hexamethylene diamine or meta-xylylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6, 10), poly(hexamethylene isophthalamide), poly(hexamethylene terephthalamide), poly(heptamethylene pimelamide) (nylon 7,7), poly(octamethylene sebacamide) (nylon 8,8), poly(nonamethylene azelamide) (nylon 9,9) poly(decamethylene azelamide) (nylon 10,9), poly(decamethylene sebacamide) (nylon 10,10), poly[bis(4-amino cyclohexyl)methane-1,10-decane-carboxamide)], poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Other matrix or host polymers which may be employed in admixture with the onium ion and EVOH intercalates of the present invention to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a copolyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly(ethylene terephthalate), poly(cyclohexylenedimethylene terephthalate), poly(ethylene dodecate), poly(butylene terephthalate), poly[ethylene(2,7-naphthalate)], poly(methaphenylene isophthalate), poly(glycolic acid), poly(ethylene succinate), poly(ethylene adipate), poly(ethylene sebacate), poly(decamethylene azelate), poly(decamethylene adipate), poly(decamethylene sebacate), poly(dimethylpropiolactone), poly(para-hydroxybenzoate) (EKONOL), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and a o-phthalic acid, 1,3-naphthalene-dicarboxylic acid, 1,4-naphthalenedicarboxylic acid, 2,6-naphthalenedicarboxylic acid, 2,7-naphthalene-dicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl)methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

Still other useful thermoplastic homopolymers and copolymer matrix polymers for forming nanocomposites with the onium ion/EVOH intercalated layered materials of the present invention are polymers formed by polymerization of alpha-beta-unsaturated monomers or the formula:

$$R^{15}R^{16}C=CH_2$$

wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly(ethylene) and ethylene copolymers. More preferred are poly(ethylene) and poly(propylene).

The mixture may include various optional components which are additives commonly employed with polar organic liquids. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

In accordance with an important feature of the present invention, the intercalate and/or platelet/carrier compositions of the present invention can be manufactured in a concentrated form, e.g., as a concentrate, e.g, having about 10–90%, preferably about 20–80% intercalate and/or exfoliated platelets of layered material and about 10–90%, preferably about 20–80% matrix polymer, particularly EVOH. The concentrate can be dispersed in the matrix polymer and optionally exfoliated, before or after addition to a polymer melt to a desired intercalate and/or platelet loading.

When shear is employed for exfoliation, any method which can be used to apply a shear to the intercalate/matrix polymer nanocomposite composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant monomer at one end of an extruder (single or double screw) and receiving the sheared material at the other end of the extruder. The temperature of the layered material/intercalant monomer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

In accordance with an important feature of the present invention, it has been found that the alkoxylated onium ion-intercalated clay can be is intercalated with the EVOH polymer by direct compounding, i.e., by mixing the alkoxylated onium ion-intercalated layered material, e.g., smectite clay, directly with the EVOH in an extruder to make the alkoxylated onium ion/EVOH intercalated clay without significant exfoliation of the clay platelets. The intercalate-filled EVOH matrix polymer extrudes into a homogeneous transparent film with excellent dispersion of the intercalate, and exceptional gas ($O_2$) impermeability. The intercalate dispersed within the EVOH is a combination of exfoliated platelets and multi-layer tactoids dispersed in the EVOH matrix polymer. The tactoids have the thickness of at least two individual platelet layers plus one to five monolayer thicknesses of intercalated EVOH polymer, and include small multiples or aggregates of platelets, in a coplanar aggregate, having the alkoxylated onium ions bonded or complexed or ion-exchanged to the platelet surface(s).

Molding compositions comprising an EVOH matrix polymer containing a desired loading of the alkoxylated onium ion/EVOH intercalates of the present invention, and/or individual platelets obtained from exfoliation of the intercalates manufactured according to the present invention, are outstandingly suitable for the production of sheets, films and panels having valuable properties. Such sheets, films and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets, films and panels can be laminated to other plastic films, sheets or panels and this is preferably effected by co-extrusion, the sheets being bonded in the molten state. The surfaces of the sheets, films and panels, including those in the embossed form, can be improved or finished by conventional methods, for example by lacquering or by the application of protective films.

EVOH matrix polymer/intercalate composite materials are especially useful for fabrication of extruded films and film laminates, as for example, films for use in food packaging that have permeabilities less than 0.1 cc, per 100 in$^2$ test area, per day, per mil thickness, and as low as 0.001 cc per 100 in$^2$, per day, per mil thickness. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed intercalate, and/or exfoliated platelets thereof, which has been alkoxylated onium ion and EVOH intercalated in accordance with the present invention, and an EVOH matrix polymer that form the preferred embodiment of the nanocomposite compositions of the present invention are formed into a film by suitable film-forming methods. Typically, the composition is melted and forced through a film forming die after EVOH intercalation and compounding. The film of the nanocomposite may go through sequential steps to cause the intercalate and/or exfoliated platelets thereof to be further oriented so the major planes through the intercalates and/or platelets thereof are substantially parallel to the major plane through the film. One method to accomplish this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits in addition to decreased permeability to gases, particularly $O_2$: increased modulus; increased wet strength; increased dimensional stability; and decreased moisture adsorption.

The following examples are presented to more particularly illustrate the invention and are not to be construed as limiting the scope of the invention.

All nanocomposites made in the following Examples were prepared with 2.5% wt/wt Nanomer® I.35L and EVAL® H101A ethylene vinyl alcohol (EVAL Company of America—division of Kuraray America, Inc.) using a co-rotating twin screw extruder. The process involves direct incorporation of the Nanomer® into the polymer matrix through extrusion melt compounding. Extruder=27 mm 36/1 L/D co-rotating twin screw with nine heated barrel zones. The dried polymer and Nanomer® are fed to the extruder feed zone via volumetric feeders.

1. Set extruder barrel temperatures as needed for the polymer: EVAL® H101A=180–210° C.
2. The produce strand is water cooled and pelletized according to standard protocol.
3. The pelletized nanocomposite is dried in a desiccant dryer before further processing.

Specimens from the films were cut to size and allowed to equilibrate in a 0% RH environment for at least three days before permeability testing. Specimens were then mounted in the Mocon, model "L", oxygen permeability apparatus according to standard protocol. Specimen thickness was an average of 0.08 mm. The mounted specimens went through a zeroing cycle of 100 hours in the Mocon apparatus followed by at least 200 hours of the test phase with 100% oxygen as the permeant.

EXAMPLE 1

This example demonstrates the preparation of organic onium ion treated clays, which can be used in the EVOH-clay nanocomposites. The onium ion treatment in this example is tertiary ethoxylated amine.

100 grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75–80° C. 62.3 grams of polyoxyethylene decyloxypropylamine (E145), available from Tomah Products, Inc., was mixed with 70 ml, 2 N HCl in 1 liter 75–80° C. de-ionized water. The amine-HCl solution was introduced to the clay dispersion, followed by vigorous mixing. The mixture was maintained at 75–80° C. for about 30 minutes, followed by a de-watering process, such as filtration. The filter cake was re-dispersed into 4 liters 75–80° C. water and the solid was collected and placed into a 75–80° C. oven to dry followed by particle size reduction. The filter cake also can be freeze-dried. The dried material has a d001 of 26 Å as measured by X-ray diffraction and was coded as E145-CWC.

EXAMPLE 2

This example demonstrates the preparation of organic onium ion treated clays, which can be used in the EVOH-clay nanocomposites. The onium ion treatment in this example is tertiary ethoxylated amine.

100 grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75–80° C. 68.1 of polyoxyethylene decyloxypropyline (E185), available from Tomah Products, Inc. was mixed with 70 ml, 2 N HCl in 1 liter 75–80° C. de-ionized water. The amine-HCl solution was introduced to the clay dispersion, followed by vigorous mixing. The mixture was maintained at 75–80° C. for about 30 minutes, followed by a de-watering process, such as filtration. The filter cake was re-dispersed into 4 liters 75–80° C. water and the solid was collected and placed into a 75–80° C. oven to dry followed by particle size reduction. The filter cake also can be freeze-dried. The dried material has a d001of 29 Å as measured by X-ray diffraction and was coded as E185-CWC.

EXAMPLE 3

This example demonstrates the preparation of alkoxylated onium ion treated clays, which can be used in the EVOH-clay nanocomposites. The onium ion treatment in this example is a quaternary ethoxylated alkyl ammonium.

100 grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75–80° C. 114.2 grams of octadecyl methyl bis-hydroxylethyl ammonium chloride (Q182, 50% solid), available from Tomah Products, was mixed with 1 liter 75–80° C. de-ionized water. The Q182 solution was introduced to the clay dispersion followed by vigorous mixing. The mixture was maintained at 75–80° C. for about 30 minutes, followed by a de-watering process, such as filtration. The filter cake was re-dispersed into 4 liters 75–80° C. water and the solid was colleted and placed into a 75–80° C. oven to dry followed by particle size reduction. The filter cake also can be freeze-dried. The dried material has a d001 of 25 Å as measured by X-ray diffraction and was coded as Q182-CWC.

EXAMPLE 4

This example demonstrates the preparation of organic onium ion treated clays, which can be used in the EVOH-clay nanocomposites. The onium ion treatment in this example is a quaternary ethoxylated alkyl ammonium.

100 grams of Na-montmorillonite clay (PGW) commercially available from Nanocor, Inc. (Arlington Heights, Ill.)

was dispersed in 3 liters of de-ionized water by mechanical paddle mixer or colloidal mill. The clay dispersion was heated to 75–80° C. 102.6 grams of isotridecyloxypropyl poly(5) oxyethylene methyl ammonium (Q-175, 73% solid), available from Tomah Products, was mixed with 1 liter 75–80° C. de-ionized water. The Q182 solution was introduced to the clay dispersion followed by vigorous mixing. The mixture was maintained at 75–80° C. for about 30 minutes, followed by a de-watering process, such as filtration. The filter cake was re-dispersed into 4 liters 75–80° C. water and the solid was colleted and placed into a 75–80° C. oven to dry followed by particle size reduction. The filter cake also can be freeze-dried. The dried material has a d001 of 28 Å as measured by X-ray diffraction and was coded as Q175-CWC.

As shown in the following Examples 5 and 6, intercalation of non-alkoxylated onium ions also functions to sufficiently space the adjacent platelets of a layered silicate material for subsequent intercalation of an EVOH oligomer or polymer, so long as the EVOH intercalation is done by direct compounding (intimately mixing the onium ion-intercalated layered material with a melt of EVOH). Films prepared from the nanocomposites of Examples 5 and 6 were clear films without visible tactoids and should provide good oxygen barrier properties.

EXAMPLE 5
Onium Ion Treated Clay from Alkyl Amine 100 grams of Na-montinorillonite clay (Na-CWC) commercially available from Nanocor, Inc. (Arlington Heights, Ill.) was dispersed in 3 liters of de-ionized water by mechanical paddle mixer or colloidal mill. The clay dispersion was heated to 75–80° C. 37.8 grams of octadecylamine, available from Akzo Nobel, was mixed with 70 ml, 2 N HCl in 1 liter 75–80° C. de-ionized water. The amine-HCl solution was introduced to the clay dispersion, followed by vigorous mixing. The mixture was maintained at 75–80° C. for about 30 minutes, followed by a de-watering process, such as filtration. The filter cake was re-dispersed into 4 liters 75–80° C. water and the solid was collected and placed into a 75–80° C. oven to dry followed by particle size reduction. The filter cake also can be freeze-dried. The dried material was a d001 of 22 Å as measured by X-ray diffraction and was coded as QDA-CWC.

EXAMPLE 6
Onium Ion Treated Clay from Alkyl Ammonium 100 grams of Na-montmorillonite clay (Na-CWC) commercially available from Nanocor, Inc. (Arlington Heights, Ill.) was dispersed in 3 liters of de-ionized water by mechanical paddle mixer or colloidal mill. The clay dispersion was heated to 75–80° C. 97.44 grams of octadecyltrimethyl ammonium chloride (Q-ST-50, 50wt % solution from Tomah Products), was added to the clay dispersion followed by vigorous mixing. The mixture was maintained at 75–80° C. for about 30 minutes, followed by a de-watering process, such as filtration. The filter cake was re-dispersed into 4 liters 75–80° C. water and the solid was collected and placed into a 75–80° C. oven to dry followed by particle size reduction. The filter cake also can be freeze-dried. The dried material has a d001 of 24 Å as measured by X-ray diffraction and was coded OD3M-CWC.

Comparative Example 1
(Untreated Clay)

Na-montmorillonite clay (PGW) was used to prepare with EVOH resins by using the same methods as described for the treated clays in Examples 1–6.

EXAMPLE 7

This example demonstrates the preparation of EVOH-clay nanocomposite with the treated clay in Examples 1–6 and Comparative Example 1 by using melt compounding technology.

EVOH resins Eval H101A and Eval F101, from Kuraray Co. Ltd. were used to prepare nanocomposites. The treated clays and EVOH resins were fed into a co-rotating twin screw extruder. The weight ratios of treated clay to EVOH resins were at 2.5 wt %, and 5 wt %, respectively. The processing temperature is from 180–210° C. in different heating zone in the extruder. The compounded product strand is water cooled and pelletized according to standard protocol. The pelletized nanocomposite is dried in a desiccant dryer before further processing.

Dried nanocomposite pellets are extruded in the unit described above with a film die in the terminal position. The films are cast onto a chill roll and produced in an un-oriented fashion. The same procedure is used for control EVOH film.

Powered XRD was done on the EVOH-clay nanocomposite films. The results are listed in Table 1. The EVOH resins have intercalated into the onium ion-treated montmorillonite clays as evidenced by the increased basal spacings. The slightly decreased basal spacing of PGW was due to the loss of water from its galleries in the process.

TABLE 1

$d_{001}$ of the treated clays in EVOH-clay

| Examples | Clays | $d_{001}$ (Å) clay | $d_{001}$ (Å) 2.5 wt %, F101 | $d_{001}$ (Å) 5 wt %, F101 | $d_{001}$ (Å) 2.5 wt %, H101 | $d_{001}$ (Å) 5 wt %, H101 |
| --- | --- | --- | --- | --- | --- | --- |
| 1 | E145-CWC | 26 | 36 | 37 | 37 | 36 |
| 2 | E185-CWC | 29 | 39 | 39 | 40 | 39 |
| 3 | Q182-CWC | 25 | 38 | 39 | 39 | 39 |
| 4 | Q175-CWC | 28 | 40 | 39 | 40 | 40 |
| 5 | ODA-CWC | 22 | 35 | 34 | 34 | 34 |
| 6 | OD3M-CWC | 24 | 34 | 33 | 33 | 34 |
| Comparative 1 | PGW | 13 | 12 | 13 | 13 | 13 |

EXAMPLE 8

This example demonstrates the preparation of EVOH-clay nanocomposite with the treated clay in Examples 1–6 and Comparative Example 1 by using solvent inclusion method.

EVOH resins Eval H101A and Eval F101, from Kuraray Co. Ltd. were used to prepare nanocomposites. The EVOH resins were dissolved into 2:1 isopropyl alcohol mixture at 90° C. The clay dispersion and EVOH dispersion were mixed together by a high shear mixer. The weight ratios of treated clay to EVOH resins were at 2.5 wt %, and 5 wt %, respectively. The solvents were removed by heat or vacuum. Dried EVOH-clay nanocomposites were obtained. The nanocomposite were fed into a co-rotating twin screw extruder for processing. The processing temperature is from 180–210° C. in different heating zone in the extruder. The compounded product strand is water cooled and pelletized according to standard protocol. The pelletized nanocomposite is dried in a desiccant dryer before further processing.

Dried nanocomposite pellets are extruded in the unit described above with a film die in the terminal position. The films are cast onto a chill roll and produced in an un-oriented fashion. The same procedure is used for control EVOH film.

Powdered XRD was done on the EVOH-clay nanocomposite films. The results are listed in Table 2. The EVOH resins have intercalated into the onium ion-treated montmorillonite clays as evidenced by the increased basal spacings. The degree of intercalation is very comparable with the nanocomposites prepared from the melt processing. It is very interesting to notice that the EVOH resins were intercalated into the PGW clay from the solvent inclusion process.

TABLE 3

Oxygen Permeability of EVOH-clay Nanocomposites Prepared With 2.5 wt % E145-CWC in Eval H101 (Oxygen Permeability Values in cc*mm/m2*day(atm)

| MATERIAL | 45% RH | 65% RH | 75% RH | 90% RH |
|---|---|---|---|---|
| Neat EVOH | $4.8 \times 10^{-3}$ | $2.7 \times 10^{-2}$ | $3.8 \times 10^{-2}$ | $1.4 \times 10^{-1}$ |
| 2.5% E145-CWC Nano-composite | $3.4 \times 10^{-3}$ | $5.0 \times 10^{-3}$ | $1.2 \times 10^{-2}$ | $8.9 \times 10^{-2}$ |
| PERMEABILITY REDUCTION % | 29 | 81 | 68 | 36 |

The data points are plotted on a normal log scale against an apparent best-fit line. Oxygen permeability values are plotted in both cc*mil/100 in2*day*atm and cc*mm/m2*day*atm. At higher loadings of nanomer, the films become even less oxygen permeable.

TABLE 2

$d_{001}$ of the treated clays in EVOH-clay

| Examples | Clays | $d_{001}$ (Å) clay | $d_{001}$ (Å) 2.5 wt %, F101 | $d_{001}$ (Å) 5 wt %, F101 | $d_{001}$ (Å) 2.5 wt %, H101 | $d_{001}$ (Å) 5 wt %, H101 |
|---|---|---|---|---|---|---|
| 1 | E145-CWC | 26 | 39 | 38 | 37 | 38 |
| 2 | E185-CWC | 29 | 39 | 40 | 40 | 39 |
| 3 | Q182-CWC | 25 | 38 | 40 | 39 | 40 |
| 4 | Q175-CWC | 28 | 41 | 40 | 40 | 40 |
| 5 | ODA-CWC | 22 | 35 | 34 | 34 | 34 |
| 6 | OD3M-CWC | 24 | 34 | 33 | 33 | 34 |
| Comparative 1 | PGW | 13 | 16 | 17 | 17 | 17 |

EXAMPLE 9

This example demonstrates the improved oxygen transmittance through the EVOH-clay nanocomposite films as described in the Examples 7 and 8.

The EVOH-clay nanocomposite were cut to size and allowed to equilibrate in a 0% RH environment for at least three days before permeability testing. Specimens were then mounted in the Mocon, model "L", oxygen permeability apparatus according to standard protocol. Specimen thickness was an average of 0.08 mm. The mounted specimens went through a zeroing cycle of 100 hours in the Mocon apparatus followed by at least 200 hours of the test phase with 100% oxygen as the permeant. The oxygen permeability results of the nanocomposites (E145-CWC) prepared from the melt processing technology were listed in Table 3. The oxygen permeability of the nanocomposites prepared with treated clays in Examples 1–6 are very comparable, whereas, the composite prepared with the untreated clays in the Comparative Example 1 showed no $O_2$ barrier improvement. The nanocomposites from the solvent inclusion route have comparative results.

EXAMPLE 10

Film Fabrication

Dried nanocomposite pellets are extruded in the unit described above with a film die in the terminal position. The films are cast onto a chill roll and produced in an unoriented fashion. The same procedure is used to make or control EVOH film.

What is claimed is:

1. A nanocomposite composition comprising about 0.05 weight percent to about 40 weight percent of a layered silicate material intercalated and ion-exchanged with an onium ion spacing agent and about 60 weight percent to about 99.95 weight percent of an ethylene vinyl alcohol matrix polymer, wherein the intercalated layered silicate material is dispersed uniformly throughout the matrix polymer.

2. A nanocomposite composition in accordance with claim 1, wherein a portion of the matrix polymer is co-intercalated into the layered silicate material.

3. A nanocomposite composition in accordance with claim 2, wherein a portion of the matrix polymer is co-intercalated into the layered silicate material while dispersing the layered material throughout the matrix polymer.

4. A nanocomposite composition in accordance with claim 2, wherein a portion of the matrix polymer is co-intercalated into the layered silicate material prior to dispersing the layered silicate material throughout the matrix polymer.

5. A nanocomposite composition in accordance with claim 1, wherein a portion of the matrix polymer is a polymer or oligomer of ethylene vinyl alcohol.

6. A nanocomposite composition in accordance with claim 1, wherein the onium ions are alkoxylated and include at least one moiety covalently bonded to a positively charged nitrogen atom that has a length of at least six carbon atoms.

7. A nanocomposite composition comprising an ethylene vinyl alcohol matrix polymer in an amount of about 40% to about 99.95% by weight, and about 0.05% to about 60% by weight of an intercalated phyllosilicate material formed by contacting a phyllosilicate with alkoxylated onium ions to ion-exchange the alkoxylated onium ions for at least 25 mole percent of the interlayer exchangeable cation capacity of the phyllosilicate thereby expanding the spacing between a predominance of the adjacent phyllosilicate platelets at least about 3 Å, when measured after sorption of the alkoxylated onium ions, and a second intercalant disposed between adjacent spaced layers of the phyllosilicate material, said second intercalant comprising an ethylene vinyl alcohol polymer.

8. A composition in accordance with claim 7, wherein the intercalated phyllosilicate is exfoliated into a predominance of individual platelets.

9. A composition in accordance with claim 7, wherein the alkoxylated onium ions are selected from the group consisting of ethoxylated onium ions, propoxylated onium ions and mixtures thereof.

10. A composition in accordance with claim 7, wherein the second intercalant further increases the spacing between a predominance of the adjacent phyllosilicate platelets at least an additional 2 Å.

11. A composition in accordance with claim 7, wherein the second intercalant is intercalated into the phyllosilicate from an intercalating composition containing said second intercalant in a concentration of at least about 5% by weight, based on the dry weight of the phyllosilicate in the intercalating composition.

12. A composition in accordance with claim 11, wherein the concentration of the second intercalant in said intercalating composition is at least about 20% by weight, based on the dry weight of the phyllosilicate in the intercalating composition.

13. A composition in accordance with claim 12, wherein the concentration of the second intercalant in said intercalating composition is at least about 30% by weight, based on the dry weight of the phyllosilicate in the intercalating composition.

14. A composition in accordance with claim 13, wherein the concentration of the second intercalant in said intercalating composition in the range of about 50% to about 80% by weight, based on the dry weight of the phyllosilicate in the intercalating compound.

15. A composition in accordance with claim 13, wherein the concentration of the second intercalant in said intercalating composition in the range of about 50% to about 200% by weight, based on the dry weight of the phyllosilicate in the intercalating composition.

16. A composition in accordance with claim 7, wherein the intercalant onium ions are ion-exchanged for the phyllosilicate interlayer cations in an amount of at least about 50 mole percent of the cation exchange capacity of said phyllosilicate.

17. A composition in accordance with claim 7, wherein the intercalant onium ions are ion-exchanged for the phyllosilicate interlayer cations in an amount of about 100 mole percent of the cation exchange capacity of said phyllosilicate.

18. A composition in accordance with claim 7, wherein the alkoxylated onium ions are multi-onium ion compounds that include at least two onium ions selected from the group consisting of primary, secondary, tertiary and quaternary ammonium ions, and mixtures thereof.

19. A composition in accordance with claim 7, wherein the matrix polymer is ethylene vinyl alcohol.

20. A nanocomposite concentrate composition comprising about 10% by weight to about 90% by weight of a layered silicate material intercalated and ion-exchanged with onium ions and about 10 weight percent to about 90 weight percent of an ethylene vinyl alcohol matrix polymer, wherein the intercalated layered silicate material is dispersed uniformly throughout the matrix polymer.

21. A nanocomposite composition in accordance with claim 20, wherein the matrix polymer is intercalated into the layered silicate material.

22. A nanocomposite composition in accordance with claim 21, wherein a portion of the matrix polymer is intercalated into the layered silicate material while dispersing the layered material throughout the matrix polymer.

23. A nanocomposite composition in accordance with claim 21, wherein a portion of the matrix polymer is intercalated into the layered silicate material prior to dispersing the layered silicate material throughout the matrix polymer.

24. A nanocomposite composition in accordance with claim 20, wherein both the matrix polymer and the polymer intercalated into the layered material are a polymer or oligomer of ethylene vinyl alcohol.

25. A nanocomposite composition in accordance with claim 20, wherein prior to intercalating the layered material with the polymer, the layered material is first intercalated and ion-exchanged with alkoxylated onium ions that include at least one moiety covalently bonded to a positively charged nitrogen atom that has a length of at least six carbon atoms.

26. A nanocomposite composition in accordance with claim 20, wherein the alkoxylated onium ions are selected from the group consisting of ethoxylated onium ions, propoxylated onium ions and mixtures thereof.

27. A method of decreasing gas permeability of a film or sheet of an ethylene vinyl alcohol matrix polymer comprising dispersing throughout said matrix polymer, in an amount of about 0.05% by weight to about 30% by weight, based on the total weight of the film or sheet material and the intercalate, an intercalate formed by intercalating an alkoxylated onium ion between layers of a layered silicate material, wherein said matrix polymer is a polymer or oligomer of ethylene vinyl alcohol, such that a portion of the matrix polymer is co-intercalated between the silicate layers of the layered material.

28. The method of claim 27, wherein the gas is selected from the group consisting of $O_2$, $CO_2$, $H_2O$, hydrocarbons, organic gas, and mixtures thereof.

29. A method in accordance with claim 27, wherein a portion of the matrix polymer is co-intercalated into the layered silicate material while dispersing the layered material throughout the matrix polymer.

30. A method in accordance with claim 27, wherein a portion of the matrix polymer is co-intercalated into the layered silicate material prior to dispersing the layered silicate material throughout the matrix polymer.

31. A method in accordance with claim 27, wherein the matrix polymer is a polymer or oligomer of ethylene vinyl alcohol having 20–50% by weight ethylene.

32. A method in accordance with claim 27, wherein the matrix polymer is a polymer or oligomer of ethylene vinyl alcohol having a degree of hydrolysis of 20–100%.

33. A method in accordance with claim 27, wherein the alkoxylated onium ions include at least one moiety covalently bonded to a positively charged nitrogen atom that has a length of at least six carbon atoms.

34. A method of manufacturing a composite material containing about 40% to about 99.95% by weight of an ethylene vinyl alcohol matrix polymer, and about 0.05% to about 60% by weight of an intercalated phyllosilicate material, said intercalated phyllosilicate having an intercalant alkoxylated onium ion spacing agent intercalated between and bonded, by ion-exchange, to an inner surface of the phyllosilicate platelets, comprising:

contacting the phyllosilicate with said intercalant alkoxylated onium ion spacing agent, to achieve intercalation and ion-exchange of said intercalant alkoxylated onium ion spacing agent between said adjacent phyllosilicate platelets in an amount sufficient to space said adjacent phyllosilicate platelets a distance of at least about 3 Å; and dispersing the intercalate throughout said matrix polymer to achieve intercalation of a portion of the matrix polymer between the phyllosilicate platelets.

35. The method of claim 34, wherein said phyllosilicate is contacted with said intercalant alkoxylated onium ion spacing agent, said phyllosilicate, and an ethylene vinyl alcohol oligomer or polymer intercalant, and wherein the concentration of the alkoxylated onium ion spacing agent is sufficient to provide a degree of onium ion intercalation such that at least about 25 mole percent of the cation exchange capacity of said phyllosilicate is exchanged with said intercalated onium ions.

36. The method of claim 35, wherein said phyllosilicate is contacted with said intercalant alkoxylated onium ion spacing agent, said phyllosilicate, and an ethylene vinyl alcohol oligomer or polymer intercalant, and wherein the concentration of the alkoxylated onium ion spacing agent is such that at least about 50 mole percent of the cation exchange capacity of said phyllosilicate is exchanged with said intercalated onium ions.

37. The method of claim 36, wherein said phyllosilicate is contacted with said intercalant alkoxylated onium ion spacing agent, said phyllosilicate, and an ethylene vinyl alcohol oligomer or polymer intercalant, and wherein the concentration of the alkoxylated onium ion spacing agent is such that about 100 mole percent of the cation exchange capacity of said phyllosilicate is exchanged with said intercalated onium ions.

38. A method of manufacturing a composite material containing about 40% to about 99.95% by weight of a matrix ethylene vinyl alcohol oligomer or polymer, and about 0.05% to about 60% by weight of an intercalated phyllosilicate material, said intercalated phyllosilicate having an intercalant onium ion spacing agent intercalated between and ion-exchanged with adjacent phyllosilicate platelets comprising:

contacting the phyllosilicate with an intercalating composition including an intercalant onium ion spacing agent such that at least about 25 mole percent of the cation exchange capacity of said phyllosilicate is exchanged with said intercalated onium ions, and an ethylene vinyl alcohol oligomer or polymer intercalant, to achieve intercalation of said intercalant alkoxylated onium ion spacing agent and said ethylene vinyl alcohol intercalant between said adjacent phyllosilicate platelets in an amount sufficient to space said adjacent phyllosilicate platelets at least an additional 3 Å;

combining the intercalated phyllosilicate with said ethylene vinyl alcohol matrix polymer, and heating the matrix polymer sufficiently to provide for flow of said matrix polymer; and dispersing said intercalated phyllosilicate throughout said matrix polymer.

39. A method in accordance with claim 38, wherein sufficient onium ions are intercalated into the phyllosilicate such that about 20% to about 100% of the interlayer cation exchange capacity of said phyllosilicate is exchanged with said intercalated alkoxylated onium ions.

40. A method in accordance with claim 38, wherein the amount of alkoxylated onium ion spacing agent intercalated into the phyllosilicate material is sufficient to provide onium ion-exchange of at least 50 mole percent of the cation exchange capacity of the phyllosilicate material.

41. A method in accordance with claim 40, wherein the amount of intercalant alkoxylated onium ion spacing agent intercalated into the phyllosilicate material is sufficient to provide onium ion-exchange for 100 mole percent of the cation exchange capacity of the phyllosilicate material.

42. A method in accordance with claim 38, wherein the weight ratio of the onium ion intercalant to phyllosilicate material, dry basis, is from about 20 grams of onium ion intercalant per 100 grams of phyllosilicate material to about 200 grams of onium ion intercalant per 100 grams of phyllosilicate material.

43. A method in accordance with claim 38, wherein the ethylene vinyl alcohol oligomer or polymer is intercalated into the phyllosilicate by melting the ethylene vinyl alcohol oligomer or polymer and dispersing the phyllosilicate throughout the ethylene vinyl alcohol melt.

44. A method in accordance with claim 43, wherein the mixing is accomplished in a mixing device selected from an extruder, thermal shock, mechanical mixer, ultrasonic, and mixtures thereof.

45. A method of manufacturing a composite material containing about 40% to about 99.95% by weight of an oligomer or polymer of ethylene vinyl alcohol, and about 0.05% to about 60% by weight of an intercalated phyllosilicate material comprising intercalating the phyllosilicate material with an alkoxylated onium ion spacing agent by contacting the phyllosilicate with alkoxylated onium ions such that at least 25 mole percent of the phyllosilicate interlayer cation exchange capacity is ion-exchanged with said alkoxylated onium ions;

forming a mixture of the intercalated phyllosilicate material with ethylene and a vinyl acetate; and subjecting the mixture to conditions sufficient to react and polymerize the ethylene and vinyl acetate reaction product, and hydrolyzing the product to form ethylene vinyl alcohol while in contact with the intercalated phyllosilicate and to co-intercalate the resulting oligomer or polymer between adjacent platelets of the phyllosilicate material, wherein the intercalate reactants are combined in amounts such that the resulting composite material contains 40% to 99.95% oligomer or polymer and 0.05% to 60% intercalated phyllosilicate.

46. In a method of preventing the passage of a gas selected from $O_2$, $CO_2$, $H_2O$, organic gas, and hydrocarbons, to a material to be protected from contact with said gas comprising disposing a film or sheet of material between a source of said gas and the material to be protected, the improvement comprising the film or sheet material, said film or sheet material comprising an ethylene vinyl alcohol matrix polymer containing an intercalated phyllosilicate containing ethylene vinyl alcohol and alkoxylated onium ion intercalants intercalated between adjacent phyllosilicate platelets in an amount sufficient to reduce the amount of gas contacting the material to be protected.

47. In the method of claim 46, wherein the amount of intercalate combined with the ethylene vinyl alcohol matrix polymer is in the range of about 2% to about 10% by weight intercalate, based on the total weight of the film or sheet material.

48. In the method of claim 46, wherein the amount of intercalate is in the range of about 3% to about 6% by weight.

49. In the method of claim 46, wherein the ethylene vinyl alcohol intercalant is an oligomer.

50. In the method of claim 49, wherein the amount of intercalate is at least about 4% by weight of the film or sheet material.

51. In the method of claim 50, wherein the amount of intercalate is at least about 5% by weight of the film or sheet material.

52. An intercalate formed by contacting a layered silicate material with an alkoxylated onium ion spacing agent to intercalate said alkoxylated onium ions in an amount sufficient for ion-exchange of at least 25 mole percent of the interlayer cation exchange capacity of said layered silicate material, to achieve sorption and ion-exchange of the alkoxylated onium ion spacing agent with interlayer exchangeable cations of said layered silicate material to expand the spacing between a predominance of the adjacent platelets of said layered material at least about 3 Å, when measured after ion-exchange with the alkoxylated onium ion spacing agent; and an ethylene vinyl alcohol oligomer or polymer second intercalant disposed between adjacent layers of said layered silicate material.

53. A method in accordance with claim 52, wherein the second intercalant further spaces a predominance of the adjacent phyllosilicate platelets at least an additional 2 Å.

54. An intercalate in accordance with claim 52, wherein the layered silicate material is contacted with said alkoxylated onium ion spacing agent in an intercalant composition comprising said layered silicate material, said alkoxylated onium ion spacing agent and a carrier for said alkoxylated onium ion spacing agent and wherein the concentration of the alkoxylated onium ion spacing agent in said intercalating composition is at least about 2% by weight, based on the dry weight of the layered silicate material.

55. A method of intercalating a phyllosilicate with both an alkoxylated onium ion and an ethylene vinyl alcohol polymer comprising slurrying the phyllosilicate in a carrier selected from water, an organic solvent, and mixtures thereof to form a phyllosilicate/water slurry; adding the alkoxylated onium ion to the phyllosilicate/water slurry; separating the alkoxylated onium ion-treated phyllosilicate from the water; drying the phyllosilicate; and then mixing the alkoxylated onium ion-treated phyllosilicate with an ethylene vinyl alcohol oligomer or polymer to intercalate the ethylene vinyl alcohol oligomer or polymer between adjacent platelets of the phyllosilicate.

* * * * *